United States Patent
Cunico et al.

(10) Patent No.: US 9,773,178 B2
(45) Date of Patent: Sep. 26, 2017

(54) VEHICLE TRACKING

(71) Applicant: International Business Machines Corporation, Armonk, NY (US)

(72) Inventors: Hernan A Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/878,309

(22) Filed: Oct. 8, 2015

(65) Prior Publication Data

US 2017/0103273 A1  Apr. 13, 2017

(51) Int. Cl.
*G06K 9/00* (2006.01)
*G06K 9/46* (2006.01)
*H04N 5/232* (2006.01)

(52) U.S. Cl.
CPC ......... *G06K 9/00825* (2013.01); *G06K 9/46* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 8,937,660 B2 | 1/2015 | Nerayoff et al. | |
| 8,953,044 B2 | 2/2015 | Wu et al. | |
| 2006/0059024 A1* | 3/2006 | Bailey | G06Q 10/02 705/5 |
| 2013/0106595 A1* | 5/2013 | Loce | G08G 1/056 340/438 |
| 2013/0217332 A1* | 8/2013 | Altman | H04H 60/90 455/41.2 |
| 2013/0238441 A1* | 9/2013 | Panelli | B60Q 1/503 705/14.62 |
| 2013/0257631 A1 | 10/2013 | Rangarajan et al. | |
| 2014/0078304 A1* | 3/2014 | Othmer | G08G 1/20 348/148 |
| 2014/0160283 A1 | 6/2014 | Hofman et al. | |
| 2015/0227999 A1* | 8/2015 | Maguire | G06Q 50/01 705/80 |

OTHER PUBLICATIONS

Garun,Natt, http://thenextweb.com/apps/2015/03/03/waze-now-displays-amber-alerts-in-app-crowdsourcing-drivers-in-the-search-for-missing-kids/, Mar. 3, 2015.

(Continued)

*Primary Examiner* — Matthew Bella
*Assistant Examiner* — Soo Shin
(74) *Attorney, Agent, or Firm* — Maeve Carpenter

(57) ABSTRACT

Techniques are described for vehicle or entity tracking. In one example, techniques include receiving a first set of data, said data comprising video or images from a first mobile data source, determining that said first set of data matches a second set of data in a first data source, the second set of data corresponding to a vehicle or entity being tracked; requesting a third set of data, said data comprising video or images from a second mobile data source, and determining a confidence level based on how well said first and third data sets match said second data set.

15 Claims, 3 Drawing Sheets

(56) References Cited

OTHER PUBLICATIONS http://www.marketwired.com/press-release/GATSO-USA-Introduces-Industrys-First-AMBER-Alert-Photo-Enforcement-Camera-Helping-Police-923624.htm, GATSO USA Introduces Industry's First AMBER Alert Photo Enforcement Camera—Helping Police Stop Child Abductions, Nov. 24, 2008.

Kent, Christine, http://rewrite.ca.com/us/articles/application-economy/crowdsourcing-for-cops.html, Jan. 13, 2015.

"What's Dropbox?", Dropbox—Tour, Dropbox, Inc (US), 3 pages, downloaded from the Internet on Mar. 27, 2017, https://www.dropbox.com/tour/1.

"Get started with Google Drive", Google, Drive Help, 3 pages, © 2017 Google, downloaded from the Internet on Mar. 27, 2017, https://support.google.com/drive/answer/2424384?hl=en.

"Anonymity Online", Tor Project: Anonymity Online, 2 pages, downloaded from the Internet on Mar. 27, 2017, https://www.torproject.org/.

\* cited by examiner

VEHICLE TRACKING

TECHNICAL FIELD

The invention relates to systems and software for data analytics and in particular relating to vehicle or entity tracking.

BACKGROUND

Some times when you are driving you might hear on the news, see on a highway traffic display or receive on your smart phone a notification about an Amber or Silver Alert. Many times these alerts include make, model, color and license plate of a vehicle of interest to the authorities. Some other times these alerts describe the person and their clothing, and location last seen. However, to be in the look-out for a vehicle or individual matching the description may be distracting from the actual driving especially if such vehicle or individual is spotted.

For most notorious cases, amber alert for example, law enforcement tries to alert the drivers to spot a certain vehicle or person and then to inform the authorities. This presents a potential distraction to the drivers as they might be in the look out and paying less attention to the current traffic conditions. Furthermore, if the vehicle or person in question is in fact spotted, the driver is faced with the problem of having to make a call while driving.

Existing art relies on static cameras previously mounted on poles (phone, flood lights, etc.) to perform vehicle spotting. The problem is that not all roads or areas have traffic cameras available. Thus, there are plenty of blind spots. Existing art focuses only on identifying vehicles, not individuals, and do require the vehicle to be running with some degree of driver intervention still required.

SUMMARY

In general, examples disclosed herein are directed to techniques for vehicle or entity tracking. In one example, techniques include receiving a first set of data, said data comprising video or images from a first mobile data source, determining that said first set of data matches a second set of data in a first data source, the second set of data corresponding to a vehicle or entity being tracked; requesting a third set of data, said data comprising video or images from a second mobile data source, and determining a confidence level based on how well said first and third data sets match said second data set.

In other example, a computer system for includes one or more processors, one or more computer-readable memories, and one or more computer-readable, tangible storage devices. Program instructions are stored on at least one of the one or more storage devices for execution by at least one of the one or more processors via at least one of the one or more memories, to receive a first set of data, said data comprising video or images from a first mobile data source, determine that said first set of data matches a second set of data in a first data source, the second set of data corresponding to a vehicle or entity being tracked; request a third set of data, said data comprising video or images from a second mobile data source, and determine a confidence level based on how well said first and third data sets match said second data set.

In another example, a computer program product includes a computer-readable storage medium has program code embodied therewith. The program code is executable by a computing device to receive a first set of data, said data comprising video or images from a first mobile data source, determine that said first set of data matches a second set of data in a first data source, the second set of data corresponding to a vehicle or entity being tracked; request a third set of data, said data comprising video or images from a second mobile data source, and determine a confidence level based on how well said first and third data sets match said second data set.

DETAILED DESCRIPTION

Figure 1:
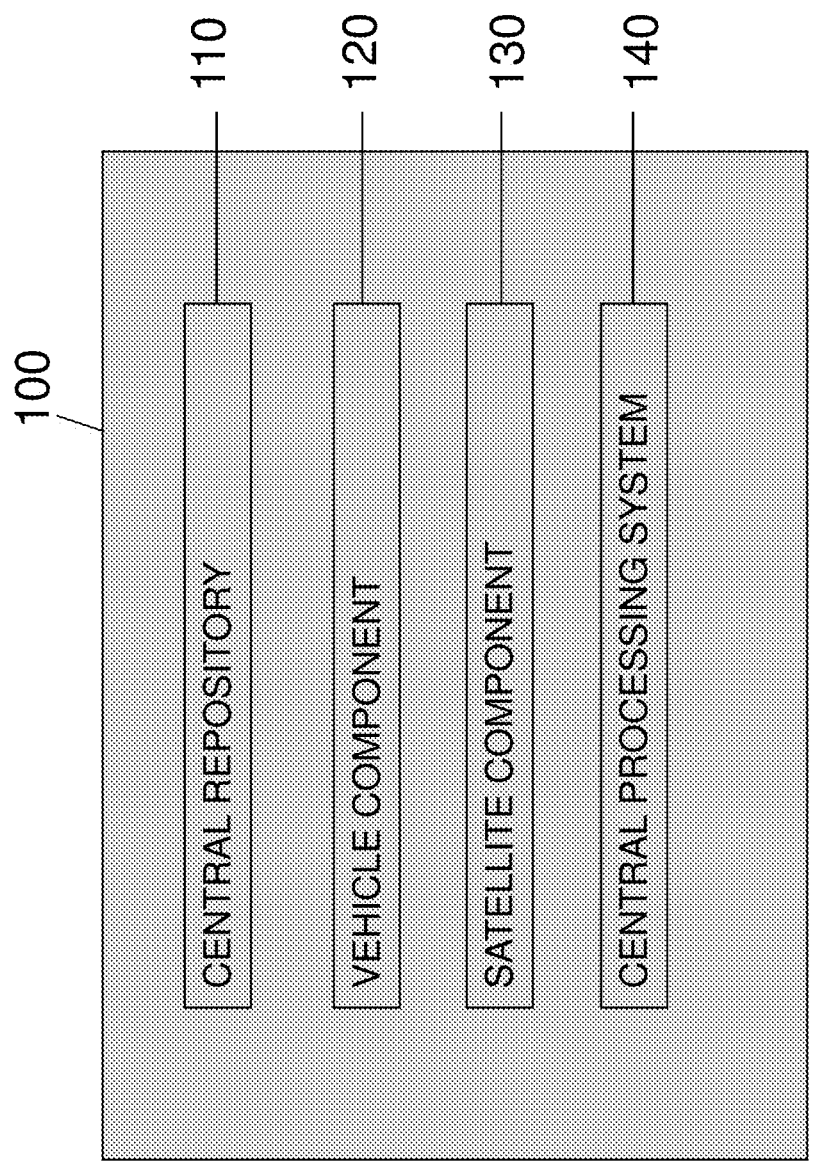
FIG. 1 is a block diagram of a system for vehicle or entity tracking.

Various examples are disclosed herein for vehicle or entity tracking. In one aspect, an automated system scans and recognizes vehicles and individuals of interest and automatically reports the location when a match is found. The system obtains a list of vehicles or individuals to identify and automatically identifies such vehicles or individuals and communicate such findings in a way that does not require driver intervention. The system employs existing technology for vehicle identification. The identification data can come from any device with a camera, from cars to smart phones to wearable devices.

The system extends existing technology by adding automation and communication. The system does not require a person to operate a camera or provide identification or communication if a match occurs. The system can be applied to various contexts including but not limited to: Amber/Silver alerts for missing persons, banks, repossession agencies, insurance companies, healthcare companies.

Noteworthy aspects of this system include:

The system uses built-in cameras in cars in conjunction with additionally mounted dashboard cameras and available smart devices as moving spotters to scan surroundings and to identify certain vehicles or persons.

The communication between authorities and registered devices is fully automated.

The system actively searches alerts in the area it is located instead of passively wait for a broadcast.

In one embodiment of the system, there is a controlled vehicle/person registry that holds details for vehicles and/or persons that are of interest to an authorized agency. This registry most likely will have to meet some legal requirements so only certain vehicles or individuals can be listed there. The system is installed on vehicles, mobile devices and potentially any other smart device with cameras. The system connects to the registry to pull a list of vehicles and/or individuals up for identification depending on the current location.

The system has access to cameras mounted on the car (front, rear, sides), and can interact with other registered smart devices that might be either mounted or hand-held and with view of the surroundings. The system uses the available cameras to scan the road and surroundings for vehicles and people in the registry. The system is able to identify and match vehicle and people characteristics.

The system works in conjunction with a GPS (GPS can be mounted in the car or stand-alone on a smart device) in order to know the current location. The system initiates connection with the registry (via satellite, cell phone, wireless, etc.) and pulls a list with descriptions of the vehicles or persons of interest that are up for identification corresponding to the current area.

When there is a match, the system anonymously sends relative GPS coordinates and information of a potential match to a central system. Central system verifies information received from spotter vehicle and tries to confirm match from different spotter vehicles. When the central system confirms match, then it sends matching information to the appropriate 3rd party. 3rd party can be law enforcement, missing persons, banks, repo agencies, etc.

If a traveling route is active on the navigation, the system might preemptively pull registry information for locations along the planned route. The system might notify the driver, if the vehicle is operating, of vehicles and persons descriptions from the registry for the current area. Depending on the implementation, the system might just notify the driver there is an active search for the area without providing any specifics so not to distract the driver.

The system identifies vehicles license plate, make, year, model, and color as well as to determine the overall vehicle condition (noticeable bumps, scratches, rust, etc.) The system recognizes individuals' details like height, clothing type, clothing color, general complexion, facial characteristics, identikit mapping, etc. The system maps and matches characteristics described in the registry against the identified vehicle or person.

When there is a match, the system anonymously sends relative GPS coordinates and information of the potential match to a central processing system. The central processing system verifies information received from spotter vehicle and tries to confirm match from different spotter vehicles to increase confidence on the match. The central system aggregates match information with the number of spotter vehicles that were able to confirm match.

A confidence level is associated with any matching, even if the report comes from a single vehicle. The more vehicles confirming the match, the higher the confidence level associated with the match. The central system sends match information to the appropriate 3rd party. This step could be as simple as appending GPS coordinates and timing of the match back into the registry.

As shown in FIG. 1 a system 100 in accordance with one embodiment of the invention includes one or more of a central registry 110, a vehicle component 120 that controls communication and interaction between the different parts of the system, a satellite component 130 that controls registration and interaction with smart devices, and a central processing system 140 that aggregates and processes matching information sets confidence level and communicates match to the corresponding authorities or updates the registries as needed.

In alternative embodiments, the system could be provided as a service or a feature that is made available on certain devices and if the service is enabled then a fee is charged or a discount is given. Also, information transmitted from spotter vehicle can be entirely anonymous.

Figure 2:
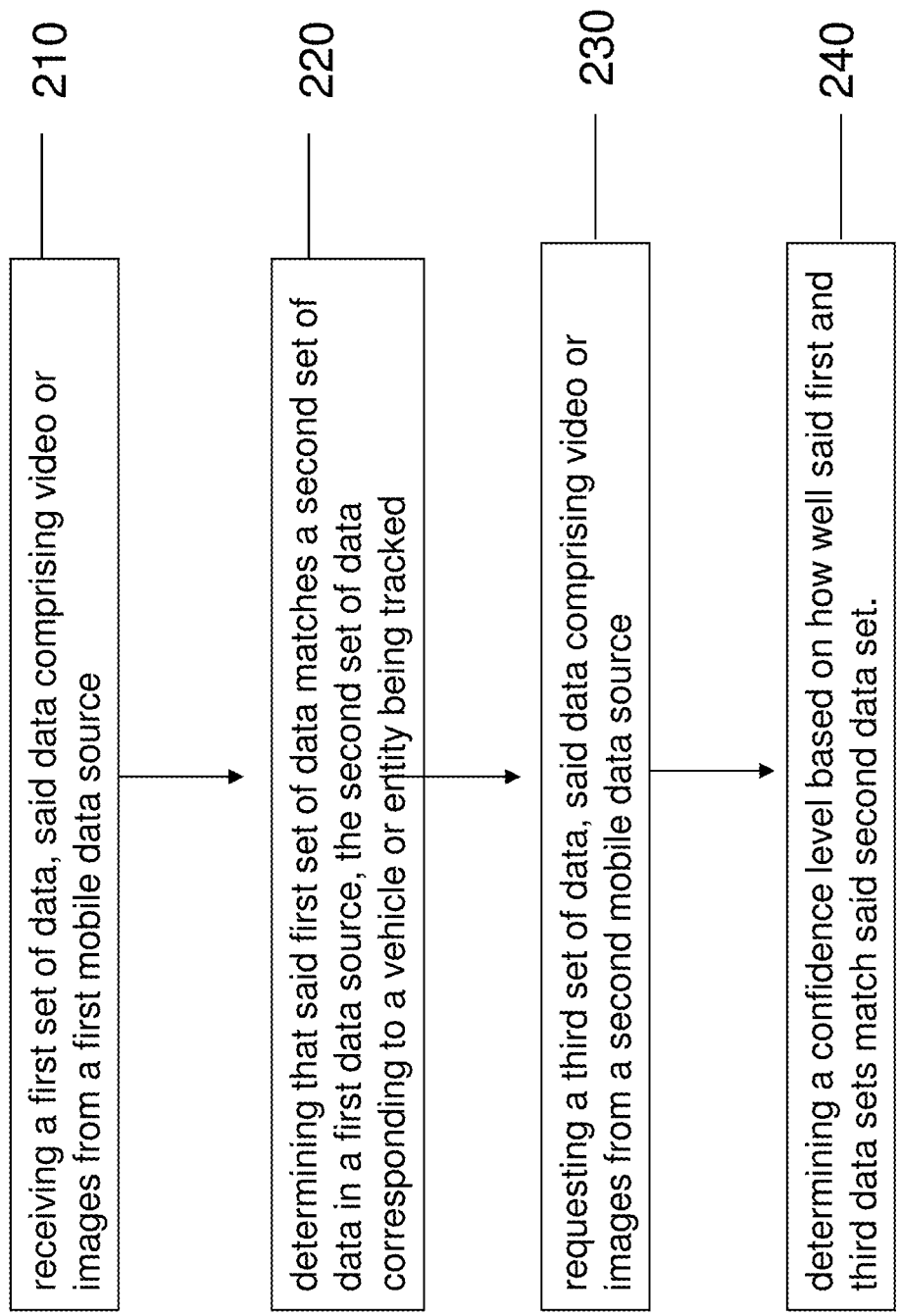
FIG. 2 is a flow diagram illustrating a method for vehicle or entity tracking.

As shown in FIG. 2, a method in accordance with one embodiment of the invention includes receiving a first set of data, said data comprising video or images from a first mobile data source (step 210), determining that said first set of data matches a second set of data in a first data source, the second set of data corresponding to a vehicle or entity being tracked (step 220); requesting a third set of data, said data comprising video or images from a second mobile data source (step 230), and determining a confidence level based on how well said first and third data sets match said second data set (step 240.)

Figure 3:
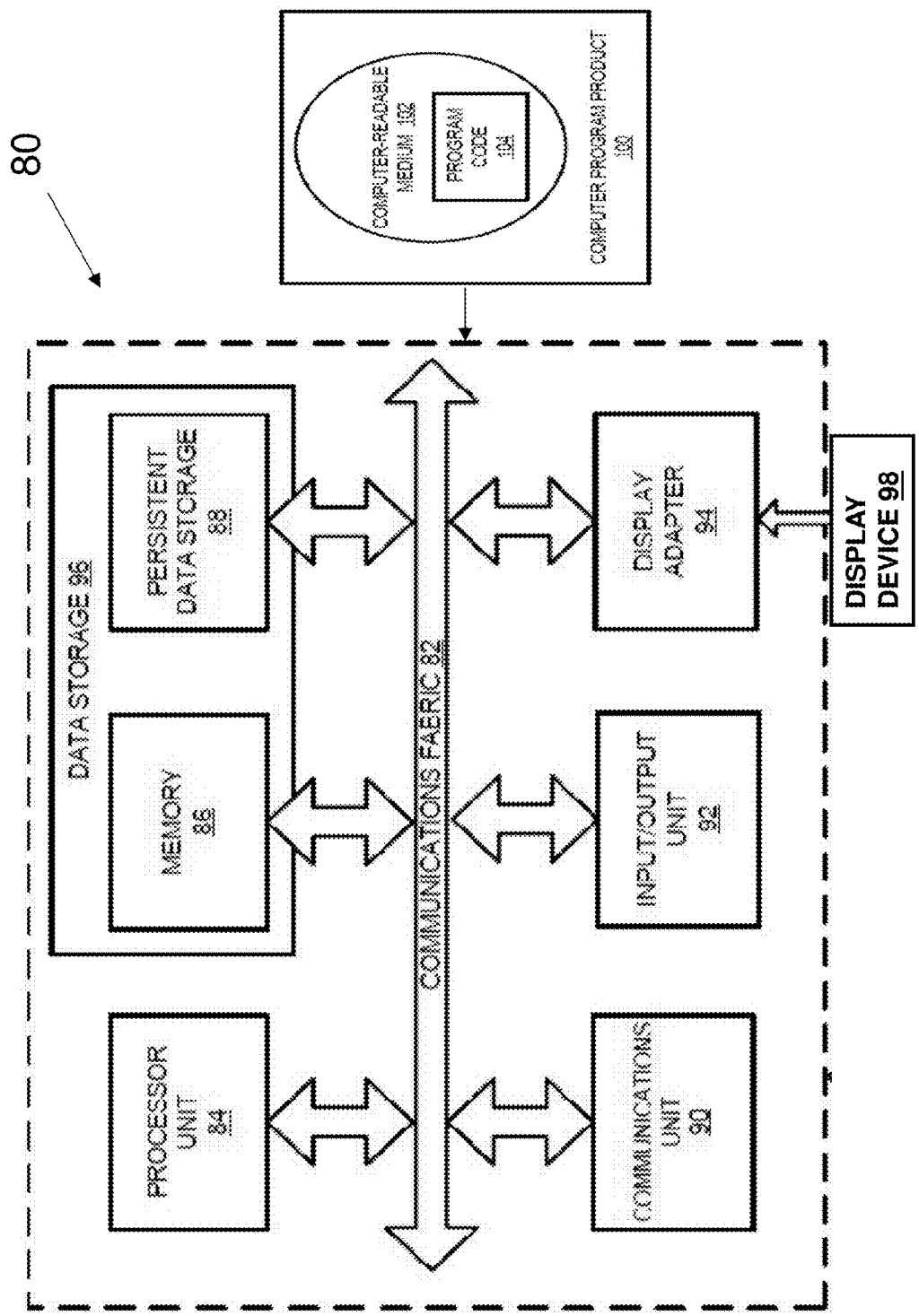
FIG. 3 is a block diagram of a computing device for vehicle or entity tracking.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for vehicle or entity tracking, the method comprising:
   actively searching for one or more alerts in a geographic area instead of passively waiting for a broadcast;
   receiving a first set of data, said data comprising video or images from a first mobile data source in the geographic area;
   determining that said first set of data matches a second set of data in a first data source, the second set of data corresponding to a vehicle or entity being tracked, as indicated in the one or more alerts, and wherein the first data source is a registry of vehicles or entities to be tracked;
   requesting a third set of data, said data comprising video or images from a second mobile data source in the geographic area; and
   determining a confidence level based on how well said first and third data sets match said second data set.

2. The method of claim 1, wherein the first or second mobile data source is a camera phone or a car-mounted camera.

3. The method of claim 1 wherein said first set of data and said third set of data are obtained anonymously.

4. The method of claim 1, wherein determining that said first set of data matches a second set of data in a first data source comprises performing the determination without user intervention.

5. The method of claim 1, further comprising:
   if there is a match, sending location information for the match to a central processing system.

6. A computer system comprising:
   one or more processors, one or more computer-readable memories, and one or more computer-readable, tangible storage devices;
   program instructions, stored on at least one of the one or more storage devices for execution by at least one of the one or more processors via at least one of the one or more memories to actively search for one or more alerts in a geographic area instead of passively waiting for a broadcast;
   program instructions, stored on at least one of the one or more storage devices for execution by at least one of the one or more processors via at least one of the one or more memories to receive a first set of data, said data comprising video or images from a first mobile data source in the geographic area;
   program instructions, stored on at least one of the one or more storage devices for execution by at least one of the one or more processors via at least one of the one or more memories to determine that said first set of data matches a second set of data in a first data source, the second set of data corresponding to a vehicle or entity being tracked, as indicated in the one or more alerts, and wherein the first data source is a registry of vehicles or entities to be tracked;
   program instructions, stored on at least one of the one or more storage devices for execution by at least one of the one or more processors via at least one of the one or more memories to request a third set of data, said data comprising video or images from a second mobile data source in the geographic area; and
   program instructions, stored on at least one of the one or more storage devices for execution by at least one of the one or more processors via at least one of the one or more memories to determine a confidence level based on how well said first and third data sets match said second data set.

7. The system of claim 6, wherein the first or second mobile data source is a camera phone or a car-mounted camera.

8. The system of claim 6, wherein said first set of data and said third set of data are obtained anonymously.

9. The system of claim 6, wherein determining that said first set of data matches a second set of data in a first data source comprises performing the determination without user intervention.

10. The system of claim 6, further comprising:
    program instructions, stored on at least one of the one or more storage devices for execution by at least one of the one or more processors via at least one of the one or more memories to if there is a match, send location information for the match to a central processing system.

11. A computer program product comprising a computer-readable storage device having program code embodied therewith, wherein the computer-readable storage device is hardware, the program code executable by a computing device to:
    actively search for one or more alerts in a geographic area instead of passively waiting for a broadcast;
    receive a first set of data, said data comprising video or images from a first mobile data source in the geographic area;
    determine that said first set of data matches a second set of data in a first data source, the second set of data corresponding to a vehicle or entity being tracked, as indicated in the one or more alerts, and wherein the first data source is a registry of vehicles or entities to be tracked;
    request a third set of data, said data comprising video or images from a second mobile data source in the geographic area; and
    determine a confidence level based on how well said first and third data sets match said second data set.

12. The program product of claim 11, wherein the first or second mobile data source is a camera phone or a car-mounted camera.

13. The program product of claim 11, wherein said first set of data and said third set of data are obtained anonymously.

14. The program product of claim 11, wherein determining that said first set of data matches a second set of data in a first data source comprises performing the determination without user intervention.

15. The program product of claim 11, further comprising:
    code executable to, if there is a match, send location information for the match to a central processing system.

* * * * *